United States Patent [19]

Jensen

[11] 4,429,436
[45] Feb. 7, 1984

[54] ANGULAR HOLDER FOR CLAMPING A HARROW TINE TO A SUPPORTING ROD

[75] Inventor: Finn U. H. Jensen, Vemmelev, Denmark

[73] Assignee: Kongskilde Koncernselskab A/S, Soro, Denmark

[21] Appl. No.: 346,270

[22] Filed: Feb. 5, 1982

[30] Foreign Application Priority Data

Feb. 19, 1981 [DK] Denmark ............................. 740/81

[51] Int. Cl.³ ............................................ A44B 21/00
[52] U.S. Cl. ...................................... 24/3 D; 24/458; 52/665
[58] Field of Search .................... 52/665; 24/3 J, 3 L, 24/3 D, 261 R

[56] References Cited

U.S. PATENT DOCUMENTS 997,022  7/1911  Tennant et al. .................... 24/261 R Primary Examiner—Robert Peshock
Attorney, Agent, or Firm—Anthony A. O'Brien

[57] ABSTRACT

The shaft of a harrow tine is clamped to a crosswise extending support rod or frame by means of an angular holder comprising a first leg to be threaded onto the shaft of the harrow tine until it abuts one lateral edge of the support rod, and a second leg to overlie the support rod and presenting at its free end an integral bolt to be inserted through a hole in the harrow tine shaft and to abut the other lateral edge of the support rod.

4 Claims, 1 Drawing Figure

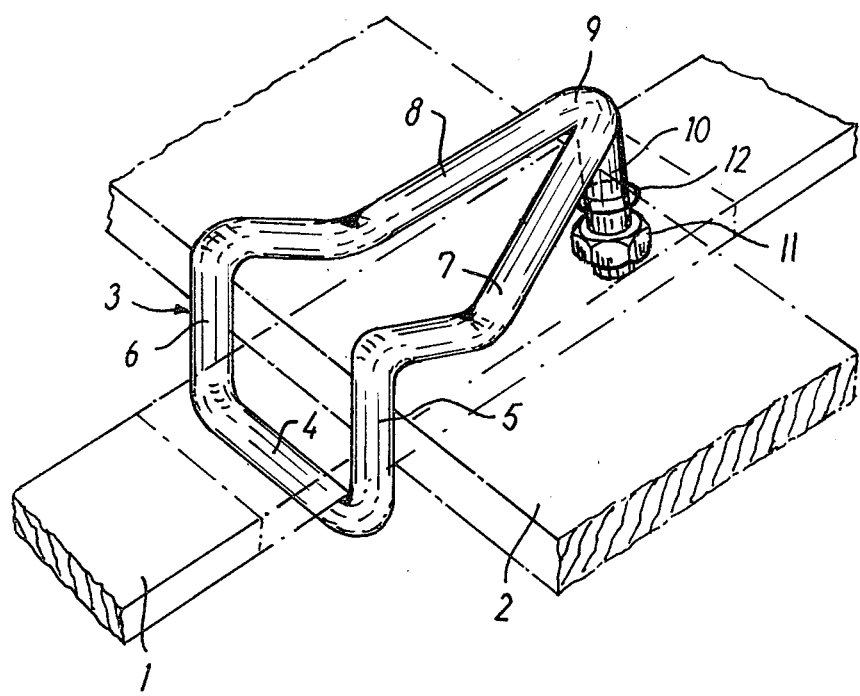

ANGULAR HOLDER FOR CLAMPING A HARROW TINE TO A SUPPORTING ROD

BACKGROUND OF THE INVENTION

For the assembling of a harrow tine with a supporting rod or frame extending transversely to the shaft, it is known to make use of an angular clamp or holder made from flat iron of appropriate strength and elasticity and comprising in its one leg an aperture which allows the clamp to be threaded on one of the elements until the leg concerned abuts the lateral edge of the second element. At the opposite lateral edge of said second element the other leg of the clamp as well as the first element have plain holes for a bolt which upon tightening produces the necessary assembling force.

An example of such a fitting is disclosed in Danish Patent Specification No. 108,324 which, moreover, illustrates, firstly that the bolt shaft may have an eccentric portion which upon rotation of the bolt makes it possible to tighten it laterally against the edge of the second element, secondly that said other leg of the clamping piece is shaped so that solely intermediate its ends it abuts said second element when the bolt is tightened.

By correct use of such a clamp or holder a reliable assembling of the two elements may be obtained, but the mounting as well as the disassemblage are impeded due to the use of a loose bolt that is normally mounted so that its head abuts the top side of the non-apertured leg of the clamp, while the associated nut tightens against the lower side of said first element. This implies that two wrenches must be used, namely for the bolt head and for the nut, respectively, and particularly as far as the nut is concerned it may be difficult to get hold by the wrench and perform the necessary turning movement.

SUMMARY OF THE INVENTION

The object of the present invention is to provide a harrow tine clamp of the same general type but of such a design that it is more easily applied and requires less material than known clamps of the same type.

More particularly, the invention relates to an angular holder for clamping a harrow tine to a supporting rod, which holder in one of its legs is formed with an aperture through which the shaft of the harrow tine may be stuck until said leg abuts one lateral edge of the supporting rod, the other leg of the holder extending past the opposite lateral edge of the supporting rod and being tightened against said supporting rod by means of a bolt to be inserted through a plain hole in the shaft of the harrow tine. According to the invention, said bolt is integral with the other leg of the holder, and prior to the final tightening of the bolt it forms an angle of slightly less than 90° with the surface of contact between the harrow tine and its supporting rod or frame.

When using a loose bolt as mentioned above, the risk obviously arises that said bolt be lost under difficult working conditions, for instance by replacing a harrow tine in the field. This risk is fully avoided by the invention and, moreover, only one wrench is required for mounting and dismounting the clamp because the bolt constitutes an integral part of the one leg of the angular holder. This holder may further be turned so that the threaded end of the bolt points upwards, thereby particularly facilitating screwing and unscrewing the nut. Further, due to the inclined initial position of the bolt, the tightening of the nut causes the bolt to be pulled laterally towards the apertured leg of the holder so that also the bolt itself will come into firm contact with the adjacent edge of the supporting rod.

According to the invention it is preferred that the first leg of the holder consists of a piece of round bar material bent into U-shape with a spacing between its branches corresponding to the width of the shaft of the harrow tine, and that the other leg comprises bent-over extensions of the U-braches which converge to a joining point, at least one of the extensions being further extended from their joining point so as to form the bolt.

In that case the consumption of material for the angular holder may be kept at a minimum, and the processing only requires bending the bar material and uniting the two U-branches by welding or forging.

The above mentioned inclined initial position of the bolt may appropriately be ensured in the way that the first leg and the bolt are slightly diverging, appropriately at an angle of about 5°, in the direction from the other leg.

BRIEF DESCRIPTION OF THE DRAWING

The drawing illustrates an embodiment of the angular holder according to the invention together with parts of a harrow tine and a supporting rod or frame clamped together by said holder.

DETAILED DESCRIPTION OF THE PREFERRED EMBODIMENT OF THE INVENTION 1 designates a part of the shaft of a harrow tine, while 2 is a part of a supporting rod or frame for the harrow tine 1.

The two elements 1 and 2 shall be tightened unyieldingly together and to this end an angular holder 3 is provided which is made from a piece of round bar material bent initially to U-shape with a bottom 4 and two branches 5 and 6 perpendicular thereto and having a spacing from one another corresponding to the width of the harrow tine shaft 1. The members 4, 5 and 6 form one leg of the holder 3 while its other leg is constituted by branch extensions 7 and 8 converging to each other and joining each other at a point 9 at which they are united by welding or forging. From this point at least one of the branches continues downwards to form a threaded bolt 10 carrying a nut 11.

The free height of the vertical U-branches 5 and 6 is a little greater than the total thickness of the two elements 1 and 2 so that the holder 3 after crosswise positioning of the two elements may be threaded on to the element 1 until the branches 5 and 6 abut the one side edge of the element 2. The holder or clamp can then be tilted so that the bolt 10 extends through a plain hole 12 in the harrow tine shaft 1, thereby simultaneously abutting the other side edge of the supporting rod 2. The nut 11 is subsequently screwed on and tightened against the lower side of the shaft 1, and as the bolt 10 initially has a slight divergence in relation to the vertical U-branches 5 and 6, it will concurrently with tightening the nut be pulled laterally towards the edge of the supporting rod 2 so as to firmly clamp said rod 2 against the U-branches 5 and 6 forming the first leg of the holder. The bent extensions 7 and 8 forming the other leg of the holder are simultaneously forcibly pulled against the top side of the supporting rod 2, and when these branch extensions 7 and 8 are slightly convex towards the rod 2, as illustrated, the pressure on said rod can be localized according to desire and the branch extensions proper may at the same time be elastically deformed by the tightening of the nut 11. To further localize the pressure, the branch extensions 7 and 8 may be provided with points or similar projections, and the supporting rod 2 may possibly be provided with depressions or the like to mark the desired points of contact. Similar marks may be provided in the side edges of the supporting rod 2 so that the two vertical U-branches 5 and 6 and the bolt 10 obtain a particularly firm grasp on said edges.

I claim:

1. In a clamping holder for clamping a tine shaft (1) to a supporting rod (2) extending transversely to the tine shaft (1) wherein a hole (12) is located in the tine shaft (1) adjacent a first lateral edge of the supporting rod (2), the combination comprising first leg means including a generally horizontal bottom member (4) adapted to engage the tine shaft (1) and a pair of generally vertical, parallel branch members (5 and 6) adapted to engage a second lateral edge of the supporting rod (2), said branch members (5 and 6) extending from opposite ends of said bottom member (4) to define a generally U-shaped element, second leg means including a pair of extensions (7 and 8) extending from the branch members (5 and 6), respectively, in parallel relation to the tine shaft (1), said extensions (7 and 8) converging toward each other and being joined together at a converged joint (9) remote from said branch members (5 and 6), a generally vertical threaded bolt (10) integrally joined to the converged joint (9) and adapted to extend across the first lateral edge of the supporting rod (2), said threaded bolt (10) adapted to extend through the hole (12) in the tine shaft (1), a nut (11) being tightened on said threaded bolt (10) against the tine shaft (1), and said threaded bolt (10) being initially inclined so as to be pressed against the first lateral edge of the supporting rod (2) upon tightening of said nut (11).

2. In a clamping holder as claimed in claim 1 wherein said first leg means (4, 5 and 6) comprises a piece of round bar material bent into a general U-shape with a spacing between its branch members (5 and 6) corresponding to the width of said tine shaft (1).

3. In a clamping holder as claimed in claim 2 wherein said first leg means (4, 5 and 6) and said threaded bolt (10) initially diverge at an angle of about 5° in a direction away from said second leg means (7 and 8)

4. In a clamping holder as claimed in claim 3 wherein each of said extensions (7 and 8) has intermediate portion adapted to contact a top side of the supporting rod (2) so that upon tightening of said nut (11) end parts of said extensions (7 and 8) are forcibly pulled against the top side of the supporting rod (2).

* * * * *